United States Patent
Mourad (10) Patent No.: US 7,894,776 B2
(45) Date of Patent: Feb. 22, 2011

(54) CORRECTION METHOD FOR A METRIC MEASUREMENT OF THE QUALITY OF TRANSMISSION IN A COMMUNICATION SYSTEM AND DEVICE IMPLEMENTING THE METHOD

(75) Inventor: Abdel-Majid Mourad, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 922 days.

(21) Appl. No.: 11/749,839

(22) Filed: May 17, 2007

(65) Prior Publication Data

US 2007/0270101 A1    Nov. 22, 2007

(30) Foreign Application Priority Data

May 19, 2006    (EP)    .................................. 06290826

(51) Int. Cl.
*H04B 17/00*    (2006.01)
(52) U.S. Cl. .................. 455/67.11; 455/67.13; 455/63.1
(58) Field of Classification Search ................ 455/63.1, 455/65, 66.1, 67.11, 67.13, 68, 69, 114.2, 455/115.1, 522
See application file for complete search history.

(56) References Cited

U.S. PATENT DOCUMENTS

2002/0058505 A1    5/2002    Kim et al.
2002/0172302 A1    11/2002    Monogioudis et al.
2005/0118958 A1 *    6/2005    Alexiou .................... 455/67.11

FOREIGN PATENT DOCUMENTS

| EP | 1 422 862 A2 | 5/2004 |
| EP | 1 533 935 A1 | 5/2005 |
| EP | 1 643 674 A1 | 4/2006 |

OTHER PUBLICATIONS

Abdel-Majid Mourad, et al., "MAI Analysis for Forward Link Mono-Dimensionally Spread OFDM Systems", Vehicular Technology Conference, XP 10766398, ISBN: 0-7803-8255-2, IEEE 59th Milan, Italy, May 17-19, 2004, Piscataway, NJ, USA, IEEE, US, May 17, 2004, pp. 1528-1533.

* cited by examiner

*Primary Examiner*—Lana N Le
*Assistant Examiner*—Ping Y Hsieh
(74) *Attorney, Agent, or Firm*—Oblon, Spivak, McClelland, Maier & Neustadt, L.L.P.

(57) ABSTRACT

The invention proposes a study of how the inaccurate knowledge of the propagation conditions and interferences and noise, affecting the received signal of a radio transmission, affects the reception and a measurement model used to estimate the quality of the transmission, in a digital radio signal receiver. Actual means to correct the measurement model and improve the accuracy of the estimation of the error rate, or any other indicator of the quality of the transmission, are proposed along with a device comprising such means.

9 Claims, 2 Drawing Sheets

CORRECTION METHOD FOR A METRIC MEASUREMENT OF THE QUALITY OF TRANSMISSION IN A COMMUNICATION SYSTEM AND DEVICE IMPLEMENTING THE METHOD

TECHNICAL FIELD

The invention concerns methods for improving the accuracy of the quality models used for evaluating the quality of data transmission from a first device to a second device through communication channels.

In the telecommunication field, especially in the field of radio telecommunication, fast evolution of the quality of data transmission of a radio link makes efficient the use of radio link adaptation and scheduling mechanisms in order to continuously adapt the transmission parameters and radio resources according to the radio link quality requirements. The accuracy of the transmission quality evaluation is of prime importance for the effectiveness of the link adaptation and scheduling mechanisms.

BACKGROUND ART

Radio transmission of a signal in a given environment is subject to numerous degradations. Signals are subject to reflections and refractions due to the presence of obstacles between the emitter and the receiver. This results in the reception of multiple copies of the emitted signals by the receiver. Transmitted signals are also subject to interferences and noise due to the radio environment.

Transmission of digital data over a radio link implies typically several steps. Digital data are constituted by sequences of bits, 0 or 1, to be transmitted. First is applied to the sequence a channel coding step. Different kinds of channel coding schemes exist. They all have the goal to add some redundancy to the bit sequence to allow reconstruction of emitted bits after transmission even when some of the emitted bits are lost. The encoded bit sequence is then subject to interleaving to break the dependency of successive bits in the sequence. Bits are mapped to modulation symbols according to the modulation scheme which can be QPSK (Quadrature Phase-shift Keying), QAM (Quadrature Amplitude Modulation) or others. Symbols are then emitted over the radio link according to the adopted air interface. The air interface defines the way the radio resource is used for the transmission and how it is shared among different users. One can cite here the transmission scheme OFDM (Orthogonal Frequency Division Multiplexing) which transmits multiple data symbols in parallel using different orthogonal frequency carriers, the multiple access schemes TDMA (Time Division Multiple Access), FDMA (Frequency Division Multiple Access) and CDMA (Code Division Multiple Access), and the multiple antennas techniques MIMO (Multiple Input Multiple Output) and beamforming. An air interface can be any combination of these schemes as OFDMA-MIMO which combines OFDM and FDMA schemes and applies MIMO techniques. At the receiver, the signal is symmetrically analyzed. It is first demodulated, besides an equalization step is applied followed by a symbol de-mapping step, a bit de-interleaving step, a channel decoding step that gives an estimation of emitted bits. The choice of the modulation scheme and the channel coding scheme leads to the Modulation and Coding Scheme (MCS). The mechanisms considered at the emitter and receiver define what is called the physical layer of the radio transmission.

We have seen that the channel coding scheme applies to a sequence of bits. This sequence for a given channel coding scheme defines what is called a codeword which is also referred as a frame in the transmission system. The choice of a given set of physical layer mechanisms defines the physical layer mode which is mainly characterized by its transmission rate and error rate. The error rate can be expressed in term of the Bit Error Rate (BER) or Frame Error Rate (FER) which is the percentage of erroneous received frames of data through the physical layer. As an example, the choice of a robust MCS, with a small number of different symbols in the modulation scheme and a high level of redundancy in the coding scheme will lead to a low transmission rate and low FER even on a bad quality radio channel while a good quality radio channel will allow a less robust MCS leading to a greater transmission rate. To optimize the use of the radio resource during the transmission it is important to adjust the chosen physical layer mode that gives the highest transmission rate keeping an acceptable FER. The notion of acceptable FER depends on the application.

The idea of radio link adaptation and scheduling is to choose the physical layer mode and allocate the radio resources giving the highest quality of transmission below the threshold of what is defined to be the acceptable quality of transmission of a given application. The quality of transmission is relative to the FER. A function of the FER, or the FER itself, can be chosen as the indicator of the quality. The problem that arises is that it is not possible to know the FER at the receiver (respectively the transmitter) because we don't know the emitted (respectively the received) data. Therefore, there is a need to provide an estimate of the FER. The accuracy of this estimation is crucial for the efficiency of the link adaptation and scheduling mechanisms. This estimation is done by applying what is called a quality model that gives an estimation of the true FER ($FER_t$), called $FER_e$, from values accessible on the duration of the transmission.

In order to be able to build a good estimation of FER, we need to find out a function to compute an estimation of FER called $FER_e$. The generic form of this function is:

$$FER_e = f_e(S_1, \ldots, S_N) \tag{1}$$

Where $f_e$ takes as entry parameters the chosen values $\{S_n\}$ that are accessible on the duration of transmission and computes the estimate value $FER_e$. With no loss of generality, the $f_e$ function can be written as a composition of two functions $f_m$, called the mapping function, and $f_c$, called the compression function:

$$FER_e = f_e(S_1, \ldots, S_N) = f_m \circ f_c(S_1, \ldots, S_N) = f_m(S_{\mathit{eff}}); \tag{2}$$

$$S_{\mathit{eff}} = f_c(S_1, \ldots, S_N)$$

$S_{\mathit{eff}}$ is called the effective measure on the transmission duration. It defines a quality metric on the transmission. $f_m$ is a correspondence table established on a simulation platform.

Figure 1:
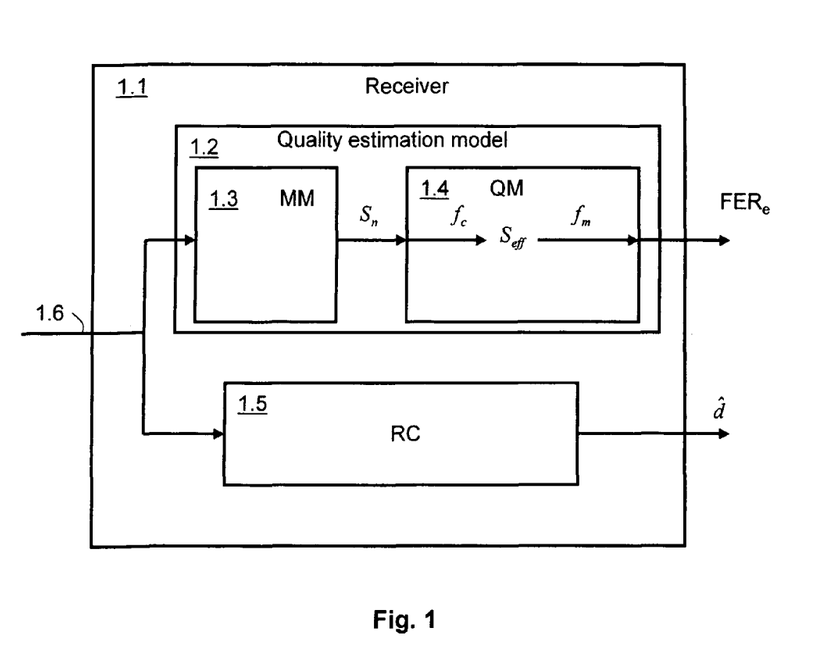
FIG. 1 represents a schematic view of a receiver in a particular embodiment of the invention.

The basic idea leading to the computation of $FER_e$ is that it is possible to define a quality model that accurately takes into account the receiving chain. This quality model gives a way to compute $FER_e$ from a judicious choice of relevant measures $\{S_n\}$. It defines the values $\{S_n\}$, the compression function $f_c$ and the mapping function $f_m$. This is illustrated FIG. 1. On this figure is presented a schematic view of a receiver 1.1. The received signals 1.6 are treated by the receiving chain 1.5 to decode the received data d̂. The received signals 1.6 are also treated by a quality estimation model 1.2 constituted by a measurement module (MM) 1.3 that makes a set of measures $\{S_n\}$ which is treated by the quality model (QM) 1.4 to build the estimate value $FER_e$ by first computing the $S_{\mathit{eff}}$ value with the $f_c$ function and then apply the $f_m$ to $S_{\mathit{eff}}$ to obtain $FER_e$. It is clear for the man skilled in the art that once the measured values {$S_n$} have been obtained, the actual computation of $FER_e$ can be done anywhere in the system, on the receiver, on the emitter or even on another device of the system. The two key points of this quality estimation model is the relevance of the chosen measures {$S_n$} and the accuracy of the quality model relatively to the receiving algorithms used in the receiving chain and the characteristics of the physical channel.

Some quality models, including a set of measures is {$S_n$} and a quality metric $S_{eff}$ have been proposed, like the exponential effective SINR model or the generalized exponential effective SINR model in *Third Generation Partnership Project* (3GPP), "*System-Level Evaluation of OFDM—Further Considerations,*" TSG-RAN, WG1 #35, RI-031303, or "*Link Performance Models for System Level Simulations of Broadband Radio Access Systems*", by K. Brueninghaus et al. in the proceedings of IEEE PIMRC conference, September 2005. A review of proposed models can be found in "*On the System Level Performance of MC-CDMA Systems in the downlink*" the PHD thesis of the inventor at *Ecole nationale supérieure des télécommunications de Bretagne*, January 2006. Another model have been proposed by the inventor in the European application EP 04293044.6 filed by the applicant on Dec. 20, 2004.

All these models have been established in the context of a perfect knowledge of the measured values {$S_n$} which generally depend on the propagation conditions of the transmission channel and on the interferences and noise affecting the signal. But when transposing these models to implement real receivers either the receiving chain and/or the measurement model are susceptible to be affected by the fact that this perfect knowledge of the propagation conditions and interferences and noise affecting the transmission can never be achieved. The values {$S_n$} are measured on the received signal, this process is prone to measurement errors and leads to estimated values {$\hat{S}_n$} instead of exact values {$S_n$}, estimated effective measure $\hat{S}_{eff}$ and a degraded estimate of $FER_e$ called $\hat{FER}_e$:

$$\hat{FER}_e = f_m(\hat{S}_{eff}); \hat{S}_{eff} = f_c(\hat{S}_1, \ldots, \hat{S}_N) \qquad (3)$$

INVENTION SUMMARY

The invention proposes a study of how the inaccurate knowledge of the propagation conditions and interferences and noise, affecting the received signal of a radio transmission, affects the reception and a measurement model used to estimate the quality of the transmission, in a digital radio signal receiver. Actual means to correct the measurement model and improve the accuracy of the estimation of the error rate, or any other indicator of the quality of the transmission, are proposed along with a device comprising such means.

The use of these means to correct the measurement model leads to a more accurate estimation of the error rate leading to an improved radio link adaptation and scheduling mechanisms.

The invention concerns a method to evaluate an indicator of the quality of data transmission from an emitter to a receiver through communication channels comprising a step of estimation of a set of values relative to the propagation conditions and the interference and noise affecting the communication channel during actual data transmission, a step of estimation of an error rate affecting the data transmission from this set of values according to a given quality model and a correction step to take into account the errors made in the evaluation of the set of values relative to the propagation conditions and the interference and noise affecting the communication channel.

According to a particular embodiment of the invention the correction step comprises a step of estimation of the error rate affecting the data transmission from said set of values according to a given quality model modified by introducing at least an adjustment parameter tuned to take into account said errors made in the evaluation of said set of values.

According to a particular embodiment of the invention the correction step comprises a step of applying to at least some of the values used in the evaluation of the quality a correction function.

According to a particular embodiment of the invention the correction function of a value, called X, giving the cumulative distribution function of said value based on an exact evaluation of said set of values relative to the propagation conditions and the interference and noise affecting the communication channel, called F, giving the cumulative distribution function of said value based on an error prone evaluation of said set of values relative to the propagation conditions and the interference and noise affecting the communication channel, called $\hat{F}$, consists of applying to the measured value X the correction function $F^{-1}(\hat{F}(X))$ to get a corrected value of X.

According to a particular embodiment of the invention said correction function is applied to each of the values of said set of values relative to the propagation conditions and the interference and noise affecting the communication channel.

According to a particular embodiment of the invention said correction function is applied to an effective measured value obtained by applying a compression function to said set of values relative to the propagation conditions and the interference and noise affecting the communication channel.

According to a particular embodiment of the invention said correction function is applied to the result of the estimated error rate.

According to a particular embodiment of the invention said correction function is applied to an indicator of the quality of the transmission computed from the estimated error rate.

According to a particular embodiment of the invention the correction step comprises a step of estimation of the error rate affecting the data transmission from said set of values according to a given quality model modified by introducing at least an adjustment parameter tuned to take into account said errors made in the evaluation of said set of values and further comprises a step of applying to at least some of the values used in the evaluation of the quality a correction function.

The invention also concerns a communication system comprising an emitter transmitting data through a communication channel to a receiver, said receiver to receive transmitted data, evaluation means to evaluate an indicator of the quality of the transmission comprising estimation means of a set of values relative to the propagation conditions and the interference and noise affecting the communication channel during actual data transmission, estimation means of an error rate affecting the data transmission from this set of values according to a given quality model and correction means to take into account the errors made in the evaluation of the set of values relative to the propagation conditions and the interference and noise affecting the communication channel.

The invention also concerns a device in the preceding communication system comprising said correction means to take into account the errors made in the evaluation of the set of values relative to the propagation conditions and the interference and noise affecting the communication channel.

BRIEF DESCRIPTION OF DRAWINGS

The characteristics of the invention will emerge more clearly from a reading of the following description of an example embodiment, the said description being produced with reference to the accompanying drawings, among which.

DETAILED DESCRIPTION $S_{eff}$ is a quality metric computed by applying the function $f_c$ to a set of instantaneous values $\{S_n\}$ measured on the duration of the transmission. The term instantaneous means that the measures are done on a transmission time interval (TTI) which is typically of the magnitude of the symbol time. The TTI defines the time granularity of the link adaptation method. The link adaptation is done for a next interval based on measures and computation done on a previous interval. Typically the TTI corresponds to the time to send a frame, but the TTI is a parameter of the system and can be arbitrary chosen.

The instantaneous values $\{S_n\}$ depend on the propagation conditions and on the interference affecting the transmission channel. Their generic expression is given by the formula:

$$S_n = g(h_n, \hat{h}_n, \sigma_n^2, \hat{\sigma}_n^2) \qquad (4)$$

Where $h_n$ is relative to the true propagation conditions over the transmission channel, $\hat{h}_n$ represents the estimate value of $h_n$ as it is measured on the receiver with the measurement error. $\sigma_n^2$ is relative to interferences and noise that affect the received signal while $\hat{\sigma}_n^2$ represents the estimate value of $\sigma_n^2$ as it is measured on the receiver with the measurement error. In other words, $h_n$ and $\sigma_n^2$ are relative to the true propagation conditions and the true interference affecting the signal while $\hat{h}_n$ and $\hat{\sigma}_n^2$ are the only knowledge of these true values, the receiver can reach due to its need to measure these values. It should also be understood that these values are not only used to compute the $\{S_n\}$ values but also, eventually, depending on the receiving algorithm chosen, used in these receiving algorithms. The very same estimations $\hat{h}_n$ and $\hat{\sigma}_n^2$ are used in the receiving chain, when needed, instead of the real unreachable $h_n$ and $\sigma_n^2$. The equation (4) expresses the fact that a judicious choice of $S_n$ should be relevant relatively to the actual transmission, therefore it should depend on the true propagation conditions and interference affecting the signal ($h_n$ and $\sigma_n^2$) and on the true receiving chain used to decode the signal depending on ($\hat{h}_n$ and $\hat{\sigma}_n^2$).

When using this scheme to compute an estimate of the frame error rate based on a quality model all the sources of error and approximation should be carefully analyzed.

First considering the $\{S_n\}$ values, the goal of these values is to give a good indication of the quality of the transmission. Their choice should be relevant according to the actual transmission, therefore they should be relevant relatively to the actual propagation conditions and interferences, and they should be relevant relatively to the actual receiving chain, chosen MCS, physical layer and air interface. This relevance is never perfect, leading to a first approximation in the choice of the $\{S_n\}$ values and how they reflect the actual transmission and reception of signals.

Secondly, considering the choice of $f_m$ and $f_c$, their purpose is to model the actual receiving chain to give an accurate estimation of the frame error rate $FER_e$. Here again, the choice of $f_m$ and $f_c$ never achieves a perfect modelling of the actual receiving chain, some approximations are done.

These quality models are defined based on an exact knowledge of the propagation conditions and interference. The validity of the models is thus obtained for exact values of $\{S_n\}$. But in real cases, when applying theses models to real transmission, as already seen the receiver usually does not have this exact knowledge of the propagation conditions or interferences. The actual computation of values $\{S_n\}$ is done according, for example, to an estimation of $h_n$ and/or $\sigma_n^2$, called $\{\hat{h}_n\}$ and $\{\hat{\sigma}_n^2\}$ leading to estimated values $\{\hat{S}_n\}$. On another hand, depending on the chosen receiving algorithms, these algorithms could use $h_n$ and/or $\sigma_n^2$. When they are using $h_n$ and/or $\sigma_n^2$ as a parameter in their decoding algorithm, they actually use their estimate $\hat{h}_n$ and/or $\hat{\sigma}_n^2$ leading to a degradation of their performance relatively to an ideal receiving chain that would work on the actual values.

To summarize, we use a quality model established to model an ideal receiving chain prone to two kinds of approximations. A first approximation done in the choice of the $\{S_n\}$ values as being relevant of the transmission. A second approximation is done when defining the functions $f_m$ and $f_c$ as a model of the receiving chain. These approximations are the source of the inaccuracy of the estimate $FER_e$ relatively to the actual frame error rate. This is due to the model. Now when applying the model to the real life, comes some measurement errors on the propagation conditions and interferences leading to the computation of an error prone value of the estimate $FER_e$ called $\hat{FER}_e$. Moreover, in cases where the receiving chain is making use of $\hat{h}_n$ and/or $\hat{\sigma}_n^2$ in its algorithms, the measurement error on these values leads also to an effective receiving chain degraded relatively to the ideal one that has served as the basis to establish the quality model. This ideal frame error rate does not anymore reflect the actual frame error rate. The validity of the model is, in this case, questioned.

Figure 2:
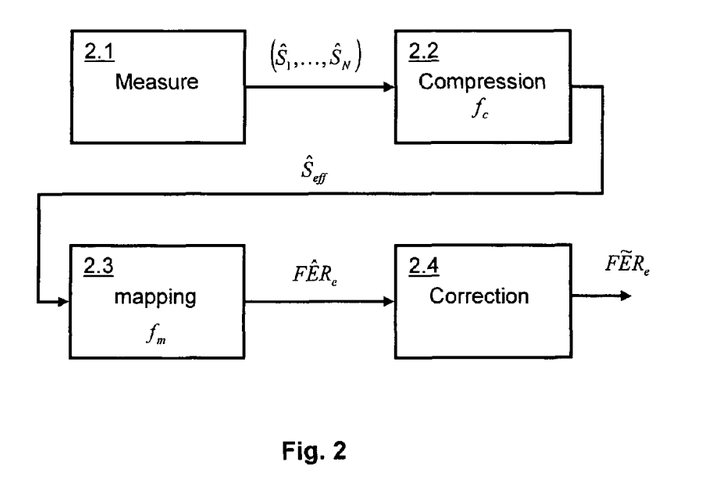
FIG. 2 represents a schematic view of the overall process as it is implemented in a particular embodiment of the invention.

The inaccuracy of the measures $\{\hat{S}_n\}$ leads to a significant degradation in the estimation of the frame error rate. A correction method has to be proposed to improve the estimation of this frame error rate. FIG. 2 illustrates a schematic view of the overall process as it is implemented, for example, in a receiver. A measurement module 2.1 is in charge of measuring the $\{\hat{S}_n\}$ values. Then, the compression function $f_c$, module 2.2, is used to compute the effective measure $\hat{S}_{eff}$. Then, the mapping function is applied to get the estimate value $\hat{FER}_e$ from the effective measure. Then, a correction function is applied to correct this estimation leading to a corrected estimation of the frame error rate called $\tilde{FER}_e$. Depending on the actual correction method used this scheme could vary.

In order to establish and validate the quality estimation model, a simulation platform has been set up. This simulation platform allows to simulate a high number of transmission in which extensive propagation conditions and interferences can be tested. It is also possible to simulate different physical layers. On the simulation platform, we have an exact knowledge of the propagation conditions and the interference. It is possible to test the measurement model and to compare the estimation of the frame error rate with the true value obtained. Concerning the receiving chain, it is possible, when the chosen receiving algorithms are using these values, to use the true values of $h_n$ and $\sigma_n^2$ or the measured ones $\hat{h}_n$ and $\hat{\sigma}_n^2$.

A first method to implement a correction in the estimation process is based on the idea to adjust the quality model in order to take into account the measurement error in the measurement model. This first method consists in introducing an adjustment parameter α in the quality model. Equation (3) becomes $$F\tilde{E}R_e = f_e(\hat{S}_1, \ldots, \hat{S}_N, \alpha) = f_m \circ f_c(\hat{S}_1, \ldots, \hat{S}_N, \alpha) = f_m(\tilde{S}_{\textit{eff}}); \quad (5)$$

$$\tilde{S}_{\textit{eff}} = f_c(\hat{S}_1, \ldots, \hat{S}_N, \alpha)$$

This adjustment parameter is tuned in a simulation platform to improve the fit between the estimated values $F\tilde{E}R_e$ and the true values $FER_e$.

This method is an attempt to take into account the measure error that occurs in the measurement model. The adjustment can be done according to the least mean square estimation pursuant to the following equation:

$$\alpha = \arg\min_x \left( \sum_{r=1}^{N_r} \left( F\tilde{E}R_e^{(r)}(x) - FER_t^{(r)} \right)^2 \right) \quad (6)$$

Where $N_r$ is the number of runs considered to determine the adjustment parameter α, $F\tilde{E}R_e^{(r)}(x)$ is the estimate of the frame error rate for the r-th run of the simulator for the value x of the adjustment parameter α and $FER_t^{(r)}$ the true error rate for the r-th run.

Some of the quality models used in the literature have already an adjustment parameter, let's call it β. This adjustment parameter is used to solve a different problem. It is used to take into account the different approximations done in the definition of the quality model. As we have seen, some approximations are done when choosing the $\{S_n\}$ values and when defining the $f_m$ and $f_c$ functions. These models have introduced the β adjustment parameter to finely adjust the model in an ideal context without any measurement errors. In such case, the model becomes a model with two different adjustment parameters, the first one, inherent to the model, β is there to adjust the model to take into account the approximations done in its definition. While the second one, added by one embodiment of the invention is there to take into account the measurement errors. In this case, one can choose to use the model as it is defined and keep the original β as adjusted in the ideal case with no measurement error, and then, adjust α to take the measurement errors into account. Another choice is to adjust both α and β when taking into account the measurement errors. This technique leads to better results particularly in the case where the receiving chain is impacted by these measurement errors. It is due to the fact that, in this case, we have seen that the validity of the model was questioned.

Actually, while introduced in the model to take into account the measurement errors, the α parameter, automatically plays also a role in the correction of the approximations done in defining the model. This is due to the fact that, by construction, modifications of the α parameters are modifications in the model. In consequence, the α parameter plays a double role, one as correcting the measurement errors and one as adapting the model.

Figure 3:
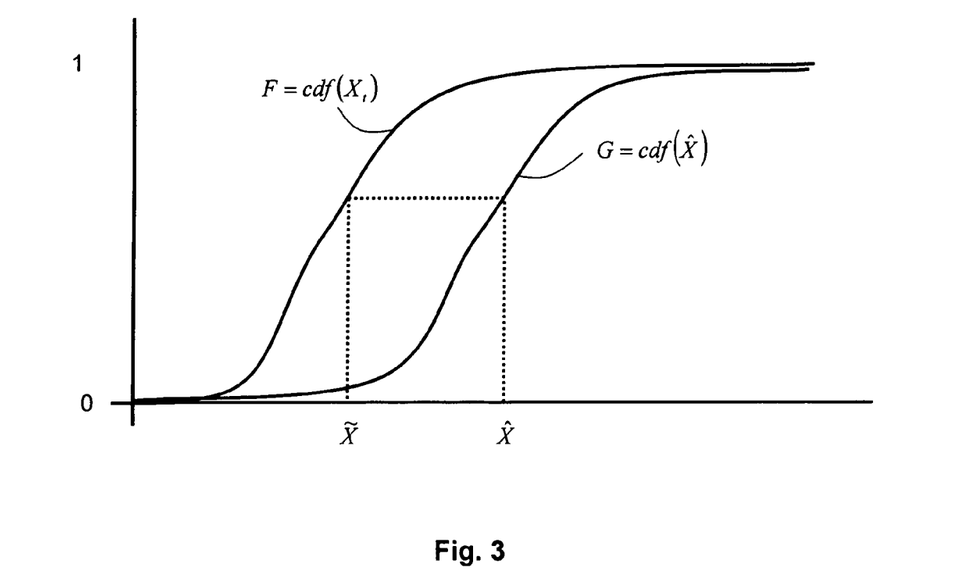
FIG. 3 represents a graphical view of the correction function used in a particular embodiment of the invention.

A second method is proposed that does not modify the quality model. This method makes use of a correction function based on the cumulative distribution function (cdf) of the variable to be corrected. If we call F the cdf of the true value $X_t$ of the variable and $F^{-1}$ its reverse function. We call $\hat{F}$ the cdf of the error prone value of the variable $\hat{X}_e$ to be corrected. Based on the fact that the functions F, $F^{-1}$ and $\hat{F}$ are known, a corrected value $\tilde{X}_e$ can be obtained by the equation:

$$\tilde{X}_e = F^{-1}(\hat{F}(\hat{X}_e)) \quad (7)$$

A graphical view of this equation is illustrated in FIG. 3.

Based on the fact that the cumulative distribution function of values like the $\{S_n\}$ values, $S_{\textit{eff}}$ or $FER_e$ can be established using the simulation platform, it is possible to compute corrected values of these expressions. Three alternatives of the second method can be sketched depending on the expression on which is applied the correction function.

In a first alternative, the measured values $\{\hat{S}_n\}$ are corrected pursuant to equation (7) where the functions F and $\hat{F}$ are, respectively, the cumulative distribution functions of the true values $\{S_n\}$ and the measured values $\{\hat{S}_n\}$. A corrected value $F\tilde{E}R_e$ is then computed from the corrected values $\{\tilde{S}_n\}$ with the following equations:

$$F\tilde{E}R_e = f_m(\tilde{S}_{\textit{eff}}); \tilde{S}_{\textit{eff}} = f_c(\tilde{S}_1, \ldots, \tilde{S}_N); \tilde{S}_n = F^{-1}(\hat{F})(\hat{S}_n)) \quad (8)$$

In a second alternative, the effective measure $\hat{S}_{\textit{eff}}$ is corrected pursuant to equation (7) where the functions F and $\hat{F}$ are, respectively, the cumulative distribution functions of the true value $S_{\textit{eff}}$ and the measured values $\hat{S}_{\textit{eff}}$. A corrected value $F\tilde{E}R_e$ is then computed from the corrected values $\tilde{S}_{\textit{eff}}$ with the following equations:

$$F\tilde{E}R_e = f_m(\tilde{S}_{\textit{eff}}); \tilde{S}_{\textit{eff}} = F^{-1}(\hat{F}(\hat{S}_{\textit{eff}})); \hat{S}_{\textit{eff}} = f_c(\hat{S}_1, \ldots, \hat{S}_N) \quad (9)$$

In a third alternative, the effective estimation $F\hat{E}R_e$ is corrected pursuant to equation (7) where the functions F and $\hat{F}$ are, respectively, the cumulative distribution functions of the actual true value $FER_t$ of the actual transmission and the estimated value $F\hat{E}R_e$. A corrected value $F\tilde{E}R_e$ is then computed with the following equations:

$$F\tilde{E}R_e = F^{-1}(\hat{F}(F\hat{E}R_e)); F\hat{E}R_e = f_m(\hat{S}_{\textit{eff}}); \hat{S}_{\textit{eff}} = f_c(\hat{S}_1, \ldots, \hat{S}_N); \quad (10)$$

This second method assumes the validity of the quality model with respect to values $\{\tilde{S}_n\}$ in its first alternative and to values $\{\hat{S}_n\}$ its second and third alternatives. Unlike the first method, this second method is an attempt to correct only the measurement errors but has no impact on the quality model itself.

The man skilled in the art will understand that in the case where a function of the FER is taken as an indicator of the quality of the transmission, the equation (7) can also be applied to any indicator of the quality of the transmission that could be computed from the estimated error rate. This indicator can be corrected in the same way. Such an indicator can be, for example, the throughput of the transmission.

A third method consists of the combination of the two first methods. We have seen that using the second method, allows to correct the measured values $\{\hat{S}_n\}$ to obtain corrected values $\{\tilde{S}_n\}$. The correction function, focused on the correction of these measured values, allows to take into account the measurement errors affecting the measurement model. Then to take into account the measurement errors affecting the receiving chain and adapt the quality model to model this error prone receiving chain, we apply the first method and introduce the adjustment parameter α.

The first method combined with the second one in its first alternative can be summarized in the equation:

$$F\tilde{E}R_e = f_m(\tilde{S}_{\textit{eff}}); \tilde{S}_{\textit{eff}} = f_c(\tilde{S}_1, \ldots, \tilde{S}_N, \alpha) \quad (11)$$

The first method combined with the second one in its second alternative can be summarized in the equation:

$$F\tilde{E}R_e = f_m(\tilde{S}_{\textit{eff}}); \tilde{S}_{\textit{eff}} = F^{-1}(\hat{F}(f_c(\hat{S}_1, \ldots, \hat{S}_N, \alpha))) \quad (12)$$

Where F and $\hat{F}$ are defined here as the cumulative distribution functions of, respectively, $S_{\textit{eff}}$ and $f_c(\hat{S}_1, \ldots, \hat{S}_N, \alpha)$.

The first method combined with the second one in its third alternative can be summarized in the equation:

$$F\tilde{E}R_e = F^{-1}(\hat{F}(f_e(\hat{S}_1, \ldots, \hat{S}_N, \alpha))) \qquad (13)$$

Where F and $\hat{F}$ are defined here as the cumulative distribution functions of, respectively, $FER_t$ and $f_e(\hat{S}_1, \ldots, \hat{S}_N, \alpha)$.

We will now describe a particular embodiment of the invention and give some results of the above described methods.

Figure 4:
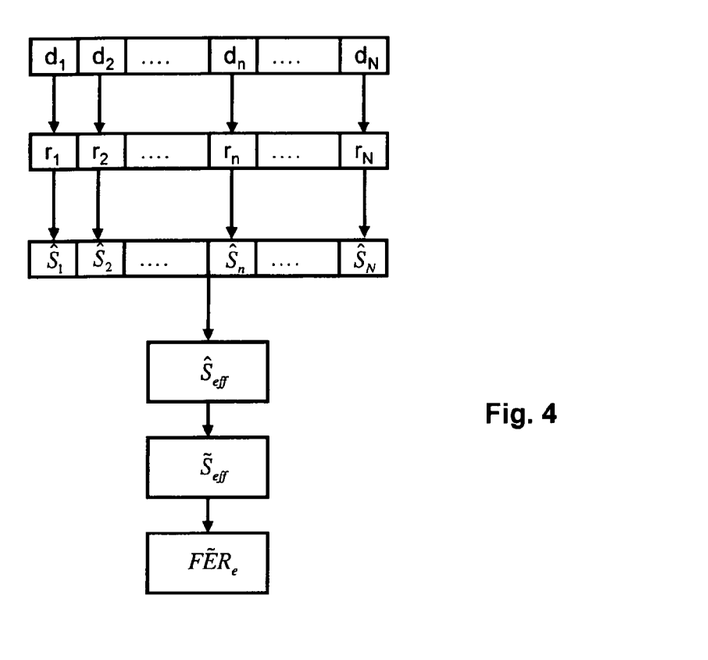
FIG. 4 illustrates the different steps of the estimation of the frame error rate in a particular embodiment of the invention.

Let's consider a multi-carrier transmission based on OFDM with one antenna. We choose the quality model called exponential effective SINR (Signal over Interference plus Noise Ratio) which is one of the most popular. The transmission time interval used for the measures is the frame, that is the codeword of the transmission. FIG. 4 illustrates an example the different steps of the estimation of the frame error rate. On this figure $d_n$ stands for the n-th emitted symbol, $r_n$ for the n-th received symbol, $\hat{S}_n$ is the n-th measured SINR. From these measured values $\{\hat{S}_n\}$ an estimation $\hat{S}_{\textit{eff}}$ is calculated. This value is corrected to obtain $\tilde{S}_{\textit{eff}}$ which allows to calculate $FER_e$.

In a frame we consider N modulated symbols $\{d_n\}$. In the context of OFDM transmission using a single antenna, each $d_n$ symbol is transmitted on an OFDM sub carrier, a frequency slot, and during the OFDM symbol time, a time slot. After emission and transmission through the propagation channel, the received symbol associated with the emitted symbol $d_n$ is written $$r_n = h_n d_n + w_n \qquad (14)$$

where $h_n$ is the coefficient of the channel affecting $d_n$, and $w_n$ is the realisation of the noise and interference affecting $d_n$. The random variable $w_n$ is assumed to be a complex centred gaussian variable of variance $\sigma_n^2$. This model is well known and commonly used to model OFDM transmission.

The channel coefficients $\{h_n\}$ are estimated by the receiver. This is usually done by transmitting pilot symbols which are known by the receiver. Several methods of estimation could be considered. We model the error done in this estimation by adding a complex gaussian noise to the coefficient $h_n$:

$$\hat{h}_n = h_n + \eta_n \qquad (15)$$

The error $\eta_n$ is assumed to be independent from $h_n$, centred with a variance $\sigma_n^2$. The estimation errors $\{\eta_n\}$ lower the decoding performances. We choose a variance $\sigma_n^2$ that gives a degradation about 1 dB for the ratio $E_b/N_0$ (transmitted energy per information bit divided by the power spectral density of the interference and noise).

For the variance $\sigma_n^2$ of the interference plus noise $w_n$, we assume that $\sigma_n^2$ is invariant with respect to index n so that $\sigma_n^2 = \sigma_w^2$ and we choose to estimate it from the received symbols using a threshold demodulator. This estimation method is simple and well known. The estimation of $\sigma_n^2 = \sigma_w^2$ is obtained according to the equation:

$$\hat{\sigma}_w^2 = \frac{1}{N} \sum_{n=1}^{N} |r_n - \hat{h}_n \tilde{d}_n|^2 \qquad (16)$$

Where $\tilde{d}_n$ is the output of the threshold demodulator associated with the received symbol $r_n$. We choose a decoder whose performances are not affected by the estimation error on $\sigma_w^2$. Thus, only the estimation errors on channel coefficients $\{h_n\}$ are affecting the performance of the decoder. This means that only the values $\{h_n\}$ and not the value $\sigma_w^2$ are used by the decoding algorithm.

The chosen quality model, exponential effective SINR, is established based on a perfect estimation of coefficients $\{h_n\}$. It is expressed by:

$$S_{\textit{eff}} = -\beta \log\left(\frac{1}{N} \sum_{n=1}^{N} \exp\left(-\frac{S_n}{\beta}\right)\right) \qquad (17)$$

Where $S_n$ is the instantaneous SINR of the received symbol $r_n$. It is expressed by:

$$S_n = \frac{|h_n|^2}{\sigma_w^2} \qquad (18)$$

As we have seen, in the case of imperfect estimation of the coefficients $\{h_n\}$, the quality model is questioned. In spite of this, we choose to keep the same model but with values $\{S_n\}$ given by:

$$S_n = \frac{|h_n \hat{h}_n^*|}{\sigma_w^2} \qquad (19)$$

Taking into account the estimation errors on coefficients $\{h_n\}$ and on variance $\sigma_w^2$, the estimate of variable $S_n$ (cf. (18) and (19)) is calculated from (15) and (16) according to:

$$\hat{S}_n = \frac{|\hat{h}_n|^2}{\hat{\sigma}_w^2} \qquad (20)$$

The $\beta$ parameter in (17) plays the role defined above to take into account the approximation done in the definition of the model. This parameter is adjusted to minimize the frame error probability. The optimum value of $\beta$ is obtained by:

$$\beta_{opt} = \arg\min \sum_{r=1}^{N_r} |\Delta e_r(\beta)|^2 \qquad (21)$$

Where $N_r$ is the number of runs used in the optimizing process, $\Delta e_r(\beta)$ is the difference between the r-th value $FER_t^{(r)}$ and its estimate $FER_t^{(r)}$ obtained according to:

$$FER_e^{(r)} = f_m(S_{\textit{eff}}^{(r)}(\beta)) \qquad (22)$$

with:

$$S_{\textit{eff}}^{(r)}(\beta) = -\beta \log\left(\frac{1}{N} \sum_{n=1}^{N} \exp\left(-\frac{S_n^{(r)}}{\beta}\right)\right) \qquad (23)$$

The difference $\Delta e_r(\beta)$ can be linearly defined:

$$\Delta e_r(\beta) = FER_t^{(r)} - FER_e^{(r)} \qquad (24)$$

or logarithmically:

$$\Delta e_r(\beta) = \log_{10}(FER_t^{(r)}) - \log_{10}(FER_t^{(r)}); \qquad (25)$$

The linear equation is appropriate for throughput-oriented link adaptation and scheduling while the logarithmic one is more appropriate for delay-oriented link adaptation and scheduling.

From the estimated values $\{\hat{S}_n\}$, the estimated $S_{eff}$ is then obtained by:

$$\hat{S}_{eff} = -\beta_{opt} \log\left(\frac{1}{N}\sum_{n=1}^{N} \exp\left(-\frac{\hat{S}_n}{\beta_{opt}}\right)\right) \quad (26)$$

Let's now study different correction methods.

The first method used in the particular embodiment of the invention corresponds to the first method described above. This method consists in adding a new adjustment parameter to the quality model to take into account the estimation errors on the values $\{\hat{S}_n\}$. As the particular model chosen has already an adjustment parameter $\beta$, in this first correction method, we choose to use this same parameter and adjust it in a way that it takes into account simultaneously the estimation errors on the values $\{\hat{S}_n\}$ and the approximations done on the model. This parameter is adjusted using the equation:

$$\tilde{\beta}_{opt} = \arg\min \sum_{r=1}^{N_r} |\Delta e_r(\tilde{\beta})|^2 \quad (27)$$

where $\Delta e_r(\tilde{\beta})$ is the difference between the r-th value $FER_t^{(r)}$ and its estimate $FER_e^{(r)}$ obtained according to:

$$FER_e^{(r)} = f_m(\tilde{S}_{eff}^{(r)}(\tilde{\beta})) \quad (28)$$

with:

$$\tilde{S}_{eff}^{(r)}(\tilde{\beta}) = -\tilde{\beta} \log\left(\frac{1}{N}\sum_{n=1}^{N} \exp\left(-\frac{\hat{S}_n^{(r)}}{\tilde{\beta}}\right)\right) \quad (29)$$

using the optimal value $\tilde{\beta}_{opt}$, the corresponding estimated $S_{eff}$, $\tilde{S}_{eff}$, becomes:

$$\tilde{S}_{eff} = -\tilde{\beta}_{opt} \log\left(\frac{1}{N}\sum_{n=1}^{N} \exp\left(-\frac{\hat{S}_n^{(r)}}{\tilde{\beta}_{opt}}\right)\right) \quad (30)$$

In the particular embodiment described, we use also a second method corresponding to the second method above in its second alternative. This method keeps the original quality model untouched. Meaning we use the adjustment parameter $\beta_{opt}$ as obtained based on a perfect estimation of values $\{S_n\}$. We use the cumulative distributive function F of the variable $S_{eff}$ calculated based on a perfect estimation of values $\{S_n\}$:

$$F = cdf(S_{eff}) \quad (31)$$

Where $S_{eff}$ is given by:

$$S_{eff} = -\beta_{opt} \log\left(\frac{1}{N}\sum_{n=1}^{N} \exp\left(-\frac{S_n}{\beta_{opt}}\right)\right) \quad (32)$$

It also uses the cumulative distributive function $\hat{F}$ of the error prone estimation of values $\{\hat{S}_n\}$:

$$\hat{F} = cdf(\hat{S}_{eff}) \quad (33)$$

Where $\hat{S}_{eff}$ is given by (26). A corrected value $\tilde{S}_{eff}$ is then obtained by:

$$\tilde{S}_{eff} = F^{-1}(\hat{F}(\hat{S}_{eff})) \quad (34)$$

In the particular embodiment described, we use also a third method corresponding to the third method in its second alternative. This method combines the first method with adjustment parameter $\tilde{\beta}$ and the second method in its second alternative. The parameter $\tilde{\beta}$ is adjusted using the equation:

$$\tilde{\beta}_{opt} = \arg\min \sum_{r=1}^{N_r} |\Delta e_r(\tilde{\beta})|^2 \quad (35)$$

Where $\Delta e_r(\tilde{\beta})$ is the difference between the r-th value $FER_t^{(r)}$ and its estimate $FER_e^{(r)}$ obtained according to:

$$FER_e^{(r)} = f_m(\tilde{S}_{eff}^{(r)}(\tilde{\beta})) \quad (36)$$

With:

$$\tilde{S}_{eff}(\tilde{\beta}) = F^{-1}(\hat{F}(\hat{S}_{eff}(\tilde{\beta}))) \quad (37)$$

And:

$$\hat{S}_{eff}(\tilde{\beta}) = -\tilde{\beta} \log\left(\frac{1}{N}\sum_{r=1}^{N} \exp\left(-\frac{\hat{S}_n^{(r)}}{\tilde{\beta}}\right)\right) \quad (38)$$

Where the functions F and $\hat{F}$ represent respectively the cumulative distribution functions of the variable $S_{eff}$ given in (32) and $\hat{S}_{eff}(\tilde{\beta})$.

Using the optimal value $\tilde{\beta}_{opt}$, the corresponding estimated $S_{eff}$, $\tilde{S}_{eff}$, becomes:

$$\tilde{S}_{eff} = F^{-1}(\hat{F}(\hat{S}_{eff}(\tilde{\beta}_{opt}))) \quad (39)$$

With:

$$\hat{S}_{eff}(\tilde{\beta}_{opt}) = -\tilde{\beta}_{opt} \log\left(\frac{1}{N}\sum_{r=1}^{N} \exp\left(-\frac{\hat{S}_n^{(r)}}{\tilde{\beta}_{opt}}\right)\right) \quad (40)$$

Where $\hat{F}$ represents the cumulative distribution functions of $\hat{S}_{eff}(\tilde{\beta}_{opt})$.

In all three methods, $\tilde{FER}_e$ is obtained using the correspondence table:

$$\tilde{FER}_e = f_m(\tilde{S}_{eff}) \quad (41)$$

To evaluate the performance we compute the root mean square error between the values $\{FER_t^{(r)}\}$ and their estimates $\{FER_e^{(r)}\}$ for a high number of realisations. This is done on a logarithmic scale given by the equation:

$$RMS = \sqrt{\sum_{r=1}^{N_r} |\log_{10}(FER_t^{(r)}) - \log_{10}(FER_e^{(r)})|^2} \quad (42)$$

We consider a four states QPSK modulation and a convolutional channel coding with a code rate of ½ and generator polynomials (753 and 561 in octal). We have made some measures in the next five cases:

Case 1: perfect estimation of values $\{S_n\}$, no estimation errors.
Case 2: with estimation errors and no correction
Case 3: with estimation errors and correction according to method 1
Case 4: with estimation errors and correction according to method 2
Case 5: with estimation errors and correction according to method 3.

In a first scenario, we use a perfect estimation of coefficients $\{h_n\}$, only $\sigma_w^2$ is estimated according to (16). $\hat{S}_n$ is given by:

$$\hat{S}_n = \frac{|h_n|^2}{\hat{\sigma}_w^2} \quad (43)$$

This scenario corresponds to the case where the error in the estimation of values $\{S_n\}$ has no impact on the performance of decoding.

TABLE 1

|     | CASE 1 | CASE 2 | CASE 3 | CASE 4 | CASE 5 |
| --- | --- | --- | --- | --- | --- |
| β   | 1.75  | 1.75  | 1.15  | 1.75  | 2.55  |
| RMS | 0.133 | 0.911 | 0.387 | 0.310 | 0.288 |

Table 1 gives the results for this first scenario. It shows that the estimation error on values $\{S_n\}$ has a great impact on the performance of the frame error rate estimation if no correction is done, about a ten factor of degradation. We can see that the correction brings a clear improvement. The improvement is better with the third method than with the second method and with the first method.

TABLE 2

|     | CASE 1 | CASE 2 | CASE 3 | CASE 4 | CASE 5 |
| --- | --- | --- | --- | --- | --- |
| α   | 1.85  | 1.85  | 1.9   | 1.85  | 1.75  |
| β   | 1.9   | 1.9   | 2.55  | 1.9   | 2.6   |
| RMS | 0.129 | 0.925 | 0.298 | 0.300 | 0.286 |

In table 2 we have used an adapted quality model with two adjustment parameters α and β instead of only one parameter β in the original model, equation (17) becomes:

$$S_{\mathit{eff}} = -\alpha \log\left(\frac{1}{N}\sum_{n=1}^{N} \exp\left(-\frac{S_n}{\beta}\right)\right) \quad (44)$$

Similarly to the adjustment parameter β in the original model, these two parameters are adjusted simultaneously according to the equation:

$$(\alpha_{opt}, \beta_{opt}) = \arg\min\sum_{r=1}^{N_r} |\Delta e_r(\alpha, \beta)|^2 \quad (45)$$

We can see that the performance in the case 1, with no estimation errors of values $\{S_n\}$, are about the same with one or two adjustment parameters. This is in accordance with the fact that the model with one parameter β is theoretically justified in this scenario. We can see that method 1 (Case 3) gives a clearly better result with two parameters instead of only one. This fact confirms that the hypothesis that the quality model is still valid with entries the estimated values $\{\hat{S}_n\}$ instead of the exact values $\{S_n\}$ is not exact. We emphasize the two different roles of adjustment parameters, one to adjust the model to take into account the approximation done in its definition, the second to take into account the estimation errors done on values $\{S_n\}$. These two roles are better handled by two different adjustment parameters α and β. This has no clear impact when using method 2 and method 3 since method 2 assumes the validity of the quality model with entries $\{S_n\}$, which is true in this scenario, but with two adjustment parameters method 1 gives similar performance than method 2.

We have shown that estimation errors on values $\{S_n\}$ result in severe degradations in the performance of the system. A correction method is thus clearly essential. In method 1, adapting the quality model with two adjustment parameters leads to better results than with one adjustment parameter originally used to take into account the approximations done in the definition of the quality model. This is because two different parameters can better handle the two roles of taking into account the estimation errors and the approximations done in the definition of the quality model. When using two adjustment parameters, all three methods are quite equivalent in term of performance with a slight advantage to method 3.

In a second scenario, we have made measures based on an error prone estimation of channel coefficients $\{h_n\}$. The estimation of $S_n$ is then done according to equation (20). In this scenario the error done on the estimation of values $\{S_n\}$ has an impact on the performance of decoding as the error prone estimated values of $\{h_n\}$ are used in the decoding algorithms. According to this scenario, the same measures have been done leading to results given in table 3 and 4.

TABLE 3

|     | CASE 1 | CASE 2 | CASE 3 | CASE 4 | CASE 5 |
| --- | --- | --- | --- | --- | --- |
| β   | 1.25  | 1.25  | 1.05  | 1.25  | 2.4   |
| RMS | 0.275 | 0.581 | 0.432 | 0.385 | 0.346 |

TABLE 4

|     | CASE 1 | CASE 2 | CASE 3 | CASE 4 | CASE 5 |
| --- | --- | --- | --- | --- | --- |
| α   | 1.75  | 1.75  | 1.6   | 1.75  | 1.2   |
| β   | 2.2   | 2.2   | 2.2   | 2.2   | 2.4   |
| RMS | 0.186 | 0.593 | 0.370 | 0.340 | 0.337 |

By looking first at case 1, with no estimation errors of values $\{S_n\}$, we can notice a clear difference in performance between the original quality model with one adjustment parameter β (see table 3) and the adapted quality model with two adjustment parameters α and β (see table 4). This is explained by the fact that the validity of the original quality model has been established for an ideal decoding chain based on an exact estimation of the coefficients $\{h_n\}$. Thus, adapting the quality model with two adjustment parameters enables us to take into account the impact of the estimation errors of the coefficients $\{h_n\}$ on the decoding. Beside this, by comparing the different correction methods, we can draw the same conclusions as in the first scenario:

(1) The quality model is better when being adapted with two adjustment parameters to take into account the estimation errors.

(2) The correction is necessary and brings a clear improvement compared to the case with no correction.

(3) All three correction methods are quite equivalent in term of performance with a slight advantage to method 2 and method 3.

We have exhibited the degradation due to the inherent errors in estimation of measured values used in methods to estimate the quality of an actual data transmission in radio communication systems. This leads to the necessity to introduce some new correction steps in these methods. Some of these methods have been defined and evaluated. This study applies to all methods used to estimate the quality of a transmission and which are based on estimation by the receiver of quantities measured with an inherent error during the actual transmission of data.

While described focusing on the estimation of the frame error rate, these methods can be extended easily to any computation of an indicator of the quality of the transmission that can be any function of the frame error rate. For example it could be a computation of the throughput which depends on the frame error rate or any other quantity representative of the quality of the transmission computed from the error rate.

The presented method can be implemented in the receiver which can compute the original values like $\{h_n\}$ and $\{\sigma_n^2\}$. But once these values have been obtained, the other steps of the computation of the estimation of the quality indicator can occur in any device in the system. It could be the emitter or even any other device in the system. The computation can also be distributed on several devices in the system.

The invention claimed is:

1. A method, implemented on a communication system including an emitter and a receiver, to evaluate an indicator of a quality of data transmission from the emitter to the receiver through a communication channel, from an estimation of an error rate, comprising:

estimating a set of values ($\{S_n\}$) relative to propagation conditions and interference and noise affecting the communication channel during actual data transmission;

estimating an error rate ($FER_e$) affecting the data transmission from this set of values according to a given quality model;

correcting, in the quality model, errors made in the estimation of the set of values ($\{S_n\}$) relative to the propagation conditions and the interference and noise affecting the communication channel by determining an adjustment parameter calculated from a simulation in which a difference between an estimated error rate and a true error rate are determined, and incorporating the adjustment parameter into the quality model for estimation of the error rate ($FER_e$).

2. The method according to claim 1, wherein the correcting further includes applying to at least some of the values a correction function.

3. The method according to claim 2 where the correction function of a value, called X, giving the cumulative distribution function of said value based on an exact estimation of said set of values ($\{S_n\}$) relative to the propagation conditions and the interference and noise affecting the communication channel, called F, giving the cumulative distribution function of said value based on an error prone estimation of said set of values relative to the propagation conditions and the interference and noise affecting the communication channel, called $\hat{F}$, consists of applying to the measured value X the correction function $F^{-1}(\hat{F}(X))$ to get a corrected value of X.

4. The method according to claim 3 where said correction function is applied to each of the values of said set of values ($\{S_n\}$) relative to the propagation conditions and the interference and noise affecting the communication channel.

5. The method according to claim 3 where said correction function is applied to an effective measured value ($S_{eff}$) obtained by applying a compression function ($f_c$) to said set of values ($\{S_n\}$) relative to the propagation conditions and the interference and noise affecting the communication channel.

6. The method according to claim 3 where said correction function is applied to the result of the estimated error rate ($FER_e$).

7. The method according to claim 3 where said correction function is applied to an indicator of the quality of the transmission computed from the estimated error rate.

8. A communication system comprising:

an emitter that transmits data through a communication channel to a receiver;

said receiver that receives the transmitted data;

an evaluation unit that evaluates an indicator of the quality of the transmission including:

a first estimation unit that estimates a set of values ($\{S_n\}$) relative to propagation conditions and interference and noise affecting the communication channel during actual data transmission;

a second estimation unit that estimates an error rate ($FER_e$) affecting the data transmission from this set of values according to a given quality model; and a correction unit that corrects errors made in the estimation of the set of values ($\{S_n\}$) relative to the propagation conditions and the interference and noise affecting the communication channel by determining an adjustment parameter calculated from a simulation in which a difference between an estimated error rate and a true error rate are determined, and incorporating the adjustment parameter into the quality model for estimation of the error rate ($FER_e$).

9. A device in a communication system which includes an emitter and a receiver, the device comprising:

an evaluation unit that evaluates an indicator of a quality of a transmission from the emitter to the receiver, the evaluation unit including:

a first estimation unit that estimates a set of values ($\{S_n\}$) relative to propagation conditions and interference and noise affecting the communication channel during actual data transmission;

a second estimation unit that estimates an error rate ($FER_e$) affecting the data transmission from this set of values according to a given quality model; and a correction that corrects errors made in the estimation of the set of values ($\{S_n\}$) relative to the propagation conditions and the interference and noise affecting the communication channel by determining an adjustment parameter calculated from a simulation in which a difference between an estimated error rate and a true error rate are determined, and incorporating the adjustment parameter into the quality model for estimation of the error rate ($FER_e$).

* * * * *